United States Patent
Hagyard, deceased et al.

[11] 3,792,229
[45] Feb. 12, 1974

[54] APPARATUS FOR ELECTROLYTIC HEATING OF LIQUIDS

[76] Inventors: Thomas Hagyard, deceased, late of 61 Bay View Rd., Moncks Bay, Christchurch, New Zealand; Robert Thomas Hagyard; Cedric Jaques Hagyard, both of Moncks Bay, Christchurch, New Zealand executors

[22] Filed: Dec. 18, 1970

[21] Appl. No.: 99,578

[30] Foreign Application Priority Data
Dec. 23, 1969 New Zealand...................... 158834

[52] U.S. Cl............... 219/284, 23/288 J, 159/13 R, 202/236, 203/89, 219/273, 219/275, 219/288
[51] Int. Cl............................. H05b 3/60, B01j 9/00
[58] Field of Search............ 219/271–276, 284–295, 219/374, 381, 307; 23/288 J, 288 S, 274–276; 34/1; 159/1, 28, 48 L, DIG. 1, DIG. 28, 13 R, 13 A; 202/108, 234, 236; 203/89, 90, 100

[56] References Cited
UNITED STATES PATENTS

| | | | |
|---|---|---|---|
| 556,040 | 3/1896 | Alberger............................ | 159/13 R |
| 1,895,492 | 1/1933 | Shapleigh........................... | 159/13 R |
| 2,108,870 | 2/1938 | Sheldon............................... | 23/276 |
| 2,522,529 | 9/1950 | Miller et al........................... | 203/89 |
| 1,688,680 | 10/1928 | Baum.................................. | 219/284 |
| 1,685,210 | 9/1928 | Baum.................................. | 219/274 |
| 2,970,953 | 2/1961 | Denig................................... | 201/19 |
| 1,662,746 | 3/1928 | Howe............................ | 219/284 UX |

FOREIGN PATENTS OR APPLICATIONS

357,848  9/1922  Germany........................... 219/284

*Primary Examiner*—A. Bartis
*Attorney, Agent, or Firm*—Spensley, Horn & Lubitz

[57] ABSTRACT

An apparatus for electrolytic heating of corrosive and other electrically conductive liquids comprises a plurality of electrically insulating shapes, such as stoneware Raschig rings, disposed between two or more electrodes. The insulating shapes are packed within a non-conductive tower and means are provided for irrigating the shapes with the liquid to be heated so that the liquid flows in a relatively thin film over the insulating shapes to provide a conductive path between the electrodes. The effective surface area of the electrodes is increased by placing between each electrode and the insulating shapes a mass of electrically conductive shapes, such as carbon Raschig rings. An overflow pipe is provided at the bottom of the tower so that the tower is maintained substantially empty of liquid.

5 Claims, 5 Drawing Figures

PATENTED FEB 12 1974

INVENTOR
THOMAS HAGYARD, DECEASED
BY ROBERT T. HAGYARD AND
CEDRIC J. HAGYARD, EXECUTORS.

BY *Spensley, Horn & Lubitz*
ATTORNEYS

APPARATUS FOR ELECTROLYTIC HEATING OF LIQUIDS

BACKGROUND OF THE INVENTION

The invention relates to apparatus for electrolytic heating, said apparatus being particularly useful in chemical processes wherein corrosive and non-corrosive liquids are to be heated and/or evaporated.

PRIOR ART

Electrolytic heating of water to raise steam is common practice, and the apparatus used comprises a container for the water, and iron electrodes supplying alternating current at, for example, 6,000 to 7,000 volts.

Such apparatus is known as an electrode boiler, and is reasonably compact because of the relatively high electrolytic resistance of the water, and the quite close electrode spacing that is thus feasible.

Numerous chemical processes require that corrosive liquids be heated and/or evaporated, and such chemical processes are expensive or difficult using conventional heating methods since heat has to be transferred through containers or heating coils made of corrosion resistant materials, which are expensive or not very suitable for heat transfer.

Electrolytic heating of the corrosive liquids overcomes the problem of finding suitable corrosion resistant containers since heat is generated in the body of the corrosive liquids and does not have to be transferred through the containers.

However, problems now arise over finding suitable corrosion resistant electrodes and a suitable arrangement thereof to generate the required amount of heat as the electrolytic conductivity of the corrosive liquids may be, for example, one thousand times as great as that for water used in the electrode boiler, and thus for a comparable service very large currents at relatively low potentials are necessary, and for economical operation correspondingly large electrode spacing and electrode size are necessary.

Apparatus for the electrolytic heating of corrosive liquids thus becomes inconveniently large and expensive using conventional methods of electrolytic cell construction.

Similar problems regarding electrode spacing and electrode size occur in apparatus for the electrolytic heating of non-corrosive liquids.

In apparatus provided by the present invention for electrolytic heating these problems are overcome by interposing between the electrodes insulating shapes, and irrigating these insulating shapes with the liquid to be heated so that said liquid flows in a relatively thin film over the insulating shapes and between the electrodes.

The electrical resistance between the electrodes is thereby increased, for example, twenty-fold, which enables smaller currents and higher potentials to be used for a given service, and permits more power to be developed in a given volume without operating at unduly low potentials nor with inconveniently massive electrodes.

BRIEF SUMMARY OF THE INVENTION

The present invention comprises two or more electrodes having insulating shapes disposed thereinbetween and means for irrigating the insulating shapes with the liquid which is to be heated. The presence of the insulating shapes between the electrodes increases the electrical resistance between them several-fold, such as, for example, by a factor of twenty. The greater resistance enables the use of higher potentials and lower currents when operating the inverted apparatus.

In operation, electrical power is applied between the electrodes, while the liquid to be heated is dispensed by suitable means to the top surfaces of the insulating shapes over which it then flows in a relatively thin film. The resulting electrolytic action causes the liquid to be heated.

A number of embodiments of the present invention are possible. Four preferred embodiments are described herein. In the first and simplest embodiment, a pair of electrodes, made from a corrosion-resistant material, are disposed within a pile of insulating shapes. Concentrated liquid is collected from the bottom of the piles, while steam generated during heating escapes from the surface of the pile.

In a second embodiment, the insulating shapes are packed into an electrically non-conductive tower between a pair of electrodes located at the top and near the bottom of the tower respectively.

During operation, concentrated liquid overflows at the bottom of the tower, while steam or other vapours, generated during the heating of the liquid, are forced to pass up the tower to the top from whence it issues.

In a third embodiment of the present invention, three electrodes are disposed in an equilateral triangular array within an electrically non-conductive tower packed with insulating shapes. The electrodes receive energy from a three-phase circuit. As in the second embodiment, concentrated liquid overflows at the bottom of the tower, while steam generated during the heating process is forced up the tower and out its top.

In a fourth embodiment of the present invention, each of a pair of electrodes is located at the top of a separate electrically non-conductive tower, the two towers being disposed within a non-conductive basin. Insulating shapes are packed into each of the towers. Each tower has its own means for irrigating the insulating shapes with the liquid which is to be heated. Concentrated liquid is collected from the basin, while steam generated issues from the top of the two towers.

In the second and fourth embodiments of this invention excessive corrosion of the electrodes may be mitigated by increasing the effective surface area of the electrodes. This is accomplished by packing the tower (or towers) adjacent the electrodes with suitably conductive shapes.

Four embodiments of the invention will now be described, by way of example only, with reference to the accompanying drawings of which:

DETAILED DESCRIPTION OF THE INVENTION

Figure 1:
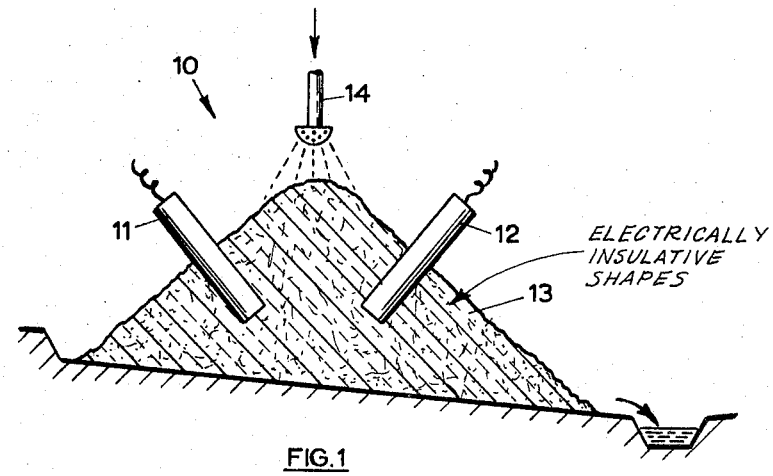
FIG. 1 is a sectional view of apparatus for electrolytic heating according to the first embodiment of the invention.
Figure 2:
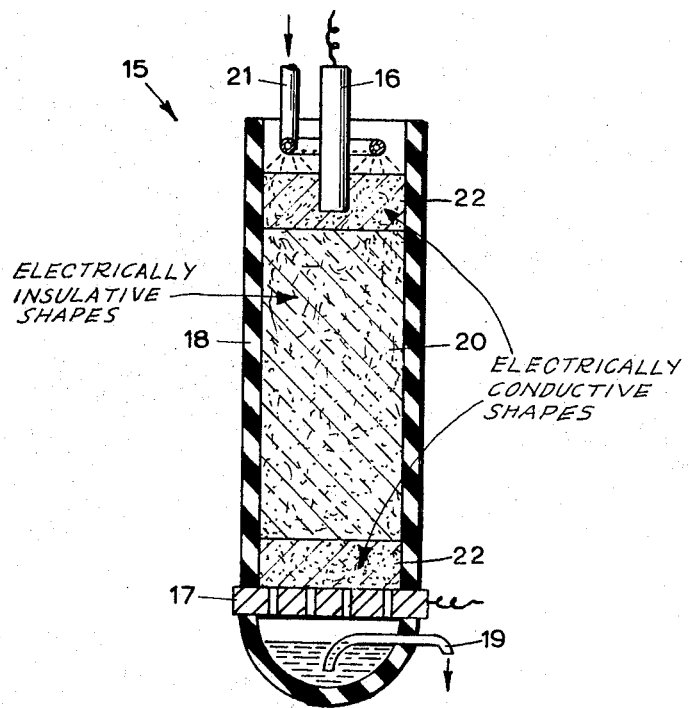
FIG. 2 is a sectional view of apparatus for electrolytic heating according to the second embodiment of the invention.
Figure 3:
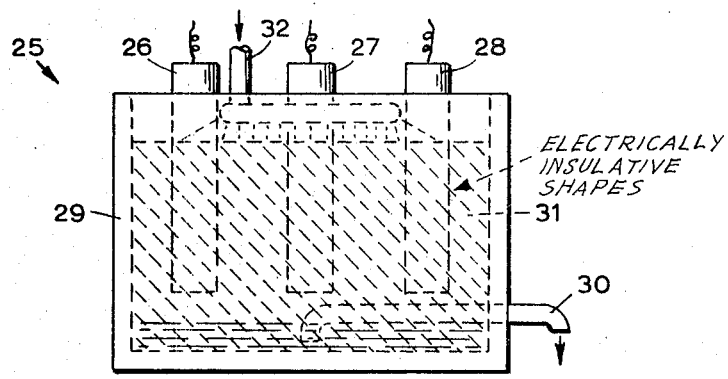
FIGS. 3 and 4 are respectively a side elevation and a plan view of apparatus for electrolytic heating according to the third embodiment of the invention.
Figure 4:
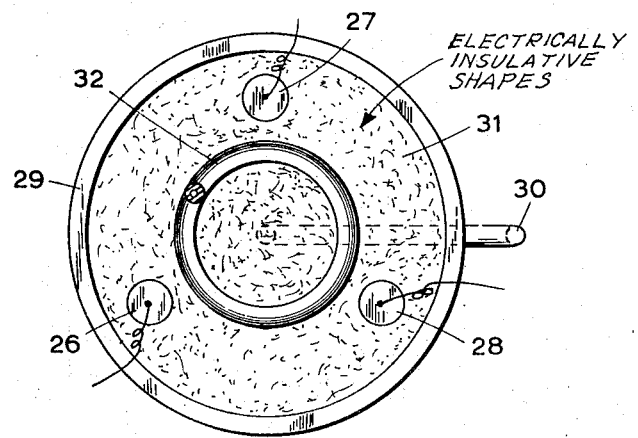
Figure 5:
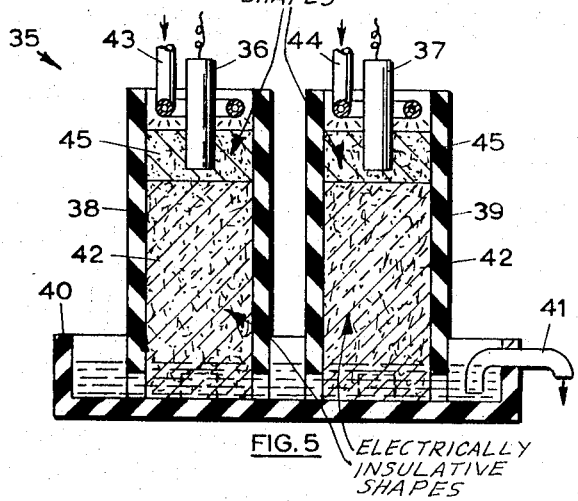
FIG. 5 is a side elevation of apparatus for electrolytic heating according to the fourth embodiment of the invention.

In the first embodiment of the invention, apparatus 10 for electrolytic heating comprises two electrodes 11 and 12, a pile of insulating shapes 13 disposed between the two electrodes 11 and 12, and means 14 for irrigating the insulating shapes 13 with a liquid to be heated so that the liquid flows in a relatively thin film over the insulating shapes 13 and between the electrodes 11 and 12.

The electrodes 11 and 12, which are arranged in a single phase circuit, are made from a corrosion resistant material such as carbon, and the insulating shapes 13 comprise a particulate insulative material such as, for example, stoneware Raschig rings.

In a three-phase circuit, a third electrode (not shown) would be disposed together with the two electrodes 11 and 12 in an equilateral triangular array.

In operation, dilute liquid is fed via the means 14 onto the top of the pile of insulating shapes 13, concentrated liquid flows from the bottom of the pile of insulating shapes 13, and steam generated during heating of the liquid escapes from the surface of the pile of insulating shapes 13.

In the second embodiment of the invention, apparatus 15 for electrolytic heating comprises two electrodes 16 and 17 disposed respectively at the top and adjacent the bottom of a corrosion resistant and electrically non-conductive tower 18 provided at the bottom with an overflow pipe 19, insulating shapes 20 packed into the tower 18 between the two electrodes 16 and 17, and means 21 for irrigating the insulating shapes 20 with a liquid to be heated so that the liquid flows in a relatively thin film over the insulating shapes 20 and between the two electrodes 16 and 17.

The electrodes 16 and 17, which are arranged in a single phase circuit, are made from a corrosion resistant material such as carbon, and the insulating shapes 20 comprise stoneware Raschig rings.

To avoid an excessive corrosive attack on the two electrodes 16 and 17, which occurs with some liquids above a limiting current density, the effective surface area of the two electrodes 16 and 17 may be increased as required by packing the tower 18 adjacent said electrodes with conductive shapes 22, which comprise electrically conductive particulate material such as, for example, carbon Raschig rings.

In operation, dilute liquid is fed via the means 21 into the top of the tower 18, concentrated liquid overflows at the bottom of the tower 18 at a constant level via the overflow pipe 19 thereby maintaining said tower substantially empty of liquid, and steam generated during heating of the liquid as it flows down the tower 18 issues from the top of said tower.

Due to the very large surface area of the insulating shapes 20 on which heating takes place, troubles due to frothing, which may occur in more conventional evaporators, do not usually set a limit on the rate of evaporation in the apparatus 15 hereinbefore described, and even with liquids prone to frothing the flow of liquid through the tower 18 can be increased almost to the flooding point of said tower.

In the third embodiment of the invention, apparatus 25 for electrolytic heating comprises three electrodes 26, 27, and 28 disposed in an equilateral triangular array within a corrosion resistant and electrically non-conductive tower 29 provided at the bottom with an overflow pipe 30, insulating shapes 31 packed into the tower 29 between the three electrodes 26, 27, and 28, and means 32 for irrigating the insulating shapes 31 with a liquid to be heated so that the liquid flows in a relatively thin film over the insulating shapes 31 and between the three electrodes 26, 27, and 28.

The three electrodes 26, 27, and 28, which are arranged in a three phase circuit, are made from a corrosion resistant material such as carbon, and the insulating shapes 31 comprise a particulate insulative material such as, for example, stoneware Raschig rings.

In operation, dilute liquid is fed via the means 32 into the top of the tower 29, concentrated liquid overflows at the bottom of the tower 29 at a constant level via the overflow pipe 30 thereby maintaining said tower substantially empty of liquid, and steam generated during heating of the liquid as it flows down the tower 29 issues from the top of said tower.

The apparatus 25 thus operates in similar fashion to the apparatus 15 hereinbefore described.

In the apparatus 15 hereinbefore described, the bottom electrode 17 is with some liquids subject to excessive corrosive attack due to the increased temperature and concentration of the liquids at the bottom of the tower 18.

In the fourth embodiment of the invention this problem is overcome by apparatus 35 comprising two electrodes 36 and 37 disposed at the top of two separate corrosion resistant and electrically non-conductive towers 38 and 39 conjoined at the bottom by a corrosion resistant and electrically non-conductive electrolyte basin 40 provided at one side with an overflow pipe 41, insulating shapes 42 packed into the two towers 38 and 39, and means 43 and 44 for irrigating the insulating shapes 42 in the two towers 38 and 39 with a liquid to be heated so that the liquid flows in a relatively thin film over the insulating shapes 42 and into the electrolyte basin 40 thereby providing a conductive path between the two electrodes 36 and 37.

The two electrodes 36 and 37, which are arranged in a single phase circuit, are made from a corrosion resistant material such as carbon, and the insulating shapes 42 comprise a particulate insulative material such as, for example, stoneware Raschig rings.

The effective surface area of the two electrodes 36 and 37 may be increased as required by packing the two towers 38 and 39 adjacent said electrodes with conductive shapes 45, which comprise electrically conductive particulate material such as, for example, carbon Raschig rings.

In a three-phase circuit, a third electrode (not shown) and a third tower (not shown) would be disposed together with the two electrodes 36 and 37 and the two towers 38 and 39 in an equilateral triangular array.

In operation, dilute liquid is fed via the means 43 and 44 into the top of the two towers 38 and 39, concentrated liquid overflows from the electrolyte basin 40 at a constant level via the overflow pipe 41 thereby maintaining the two towers 38 and 39 substantially empty of liquid, and steam or other vapors generated during heating of the liquid as is flows down the two towers 38 and 39 issues from the top of said towers and from the top of the electrolyte basin 40.

In the apparatus 10, 15, 25, and 35 hereinbefore described, the insulating shapes 13, 20, 31, and 42 may take other forms, such as Lessing rings, Pall rings, Berl saddles, pebbles, and the like, and be made from other corrosion resistant and electrically non-conductive materials.

Similarly the conductive shapes 22 and 45 may take other forms and be made from other corrosion resistant and electrically conductive materials, and the electrodes 11, 12, 16, 17, 26, 27, 28, 36, and 37 may take any suitable form and be made from other corrosion resistant and electrically conductive materials.

It is claimed:

1. Apparatus for electrolytic heating comprising electrodes, insulating shapes disposed between said electrodes and means for irrigating the insulating shapes with a liquid to be heated so that the liquid flows in a relatively thin film over said insulating shapes and between said electrodes, said electrodes being disposed within at least one corrosion-resistant and electrically non-conductive tower packed with said insulating shapes, the effective surface area of each of said electrodes being increased by placing adjacent said electrode electrically conductive particulate material shapes, said tower being provided at the bottom with an overflow pipe so that said tower is maintained substantially empty of fluid.

2. Apparatus for electrolytic heating according to claim 1, wherein said electrically conductive shapes comprise carbon Raschig rings.

3. Apparatus for electrolytic heating according to claim 1, having first and second electrodes, said first electrode being disposed at the top of said tower and said second electrode being disposed adjacent to the bottom of said tower.

4. Apparatus for electrolytic heating according to claim 1, wherein said electrodes are made from carbon.

5. Apparatus for electrolytic heating according to claim 1, wherein said insulating shapres comprise stoneware Raschig rings.

* * * * *